United States Patent [19]

Cox

[11] Patent Number: 5,021,009
[45] Date of Patent: Jun. 4, 1991

[54] WALL MOUNTING PLATE

[76] Inventor: Michael Cox, R.R. #2, Orangeville, Ontario, Canada, L9Y 2Y9

[21] Appl. No.: 330,916

[22] Filed: Mar. 31, 1989

Related U.S. Application Data

[63] Continuation-in-part of Ser. No. 152,819, Feb. 5, 1988, Pat. No. 4,840,584.

[51] Int. Cl.[5] .............................................. H01R 13/74
[52] U.S. Cl. ..................................... 439/538; 439/557
[58] Field of Search ............... 439/535, 536, 552, 554, 439/555, 557, 558, 565; 248/27.3

[56] References Cited

U.S. PATENT DOCUMENTS

| | | | |
|---|---|---|---|
| 2,891,103 | 6/1959 | Swengel | 439/373 |
| 3,366,729 | 1/1968 | Pauza | 439/358 |
| 3,643,132 | 2/1972 | Odmark | 439/552 |
| 4,043,629 | 8/1977 | Brannen | 439/536 |
| 4,407,559 | 10/1983 | Meyer | 439/536 |
| 4,451,106 | 5/1984 | Wiseheart et al. | 439/536 |
| 4,588,854 | 5/1986 | Bailey et al. | 439/567 |
| 4,717,358 | 1/1988 | Chaundy | 439/557 |

Primary Examiner—Gary F. Paumen

[57] ABSTRACT

A wall mounting plate assembly simplifies installation while providing positive securement with a substrate such as a wall, ceiling, floor, duct work or like substrates and is particularly suitable for low voltage electrical connection applications. A plug portion is receivable within a port provided in a face plate which includes a tubular extension. The tubular extension acts as a guide for accommodating movement of the plug from a nonsecuring position to an engaging or operative position. Preferably, a spring bias is created as the plug is forced into the face plate which serves to draw the face plate towards wall engaging arms which moved outwardly past the tubular extension as the plug is moved to the engaging position. The assembly allows more convenient porting of the wall or substrate and simplifies installation.

12 Claims, 4 Drawing Sheets

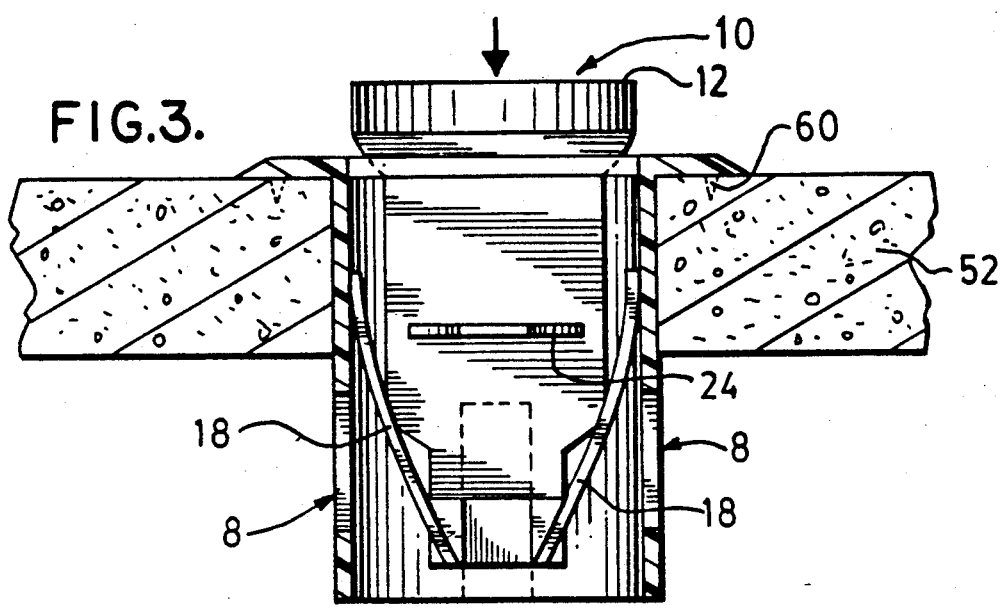
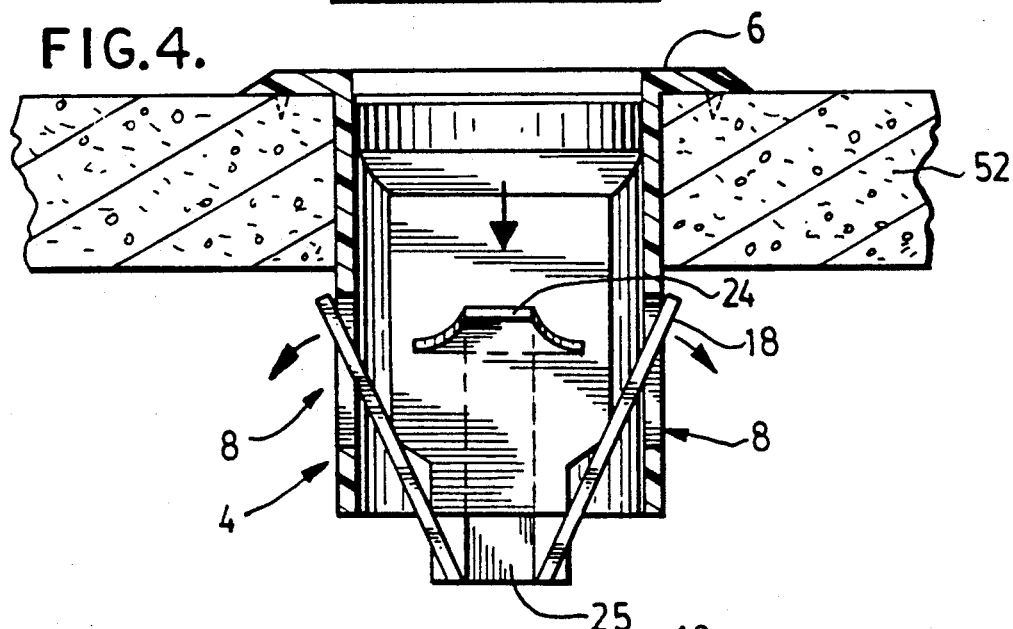
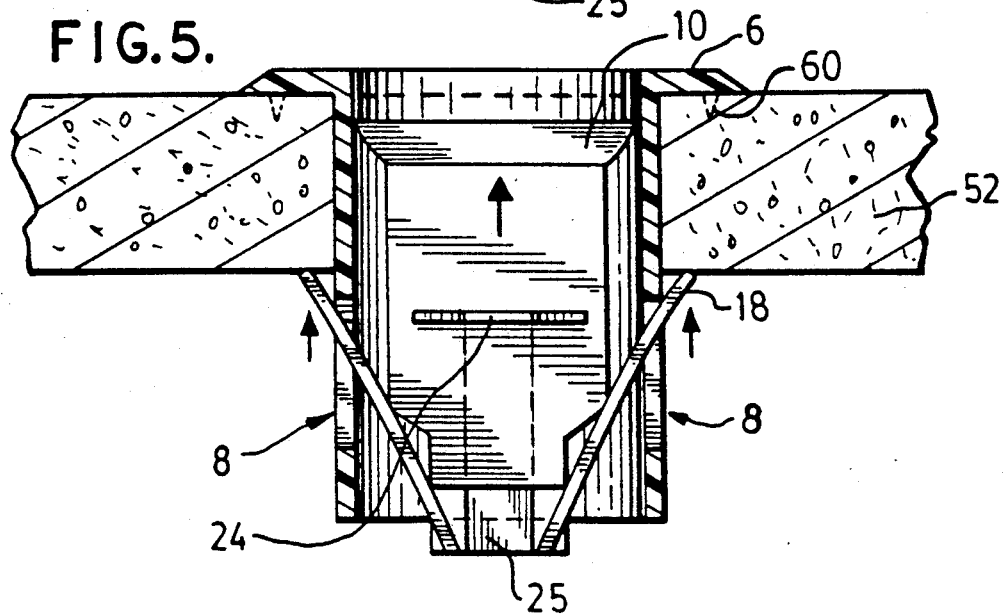

WALL MOUNTING PLATE

This is a continuation-in-part of application Ser. No. 152,819, filed Feb. 5, 1988, now Pat. No. 4,840,584.

BACKGROUND OF THE INVENTION

The present invention realtes to a mounting plate assembly suitable for electrical connections, particularly electrical connections for low voltage applications.

A host of different arrangements for effecting electrical connections are known as exemplified by the references cited in my co-pending application, namely U.S. Pat. No. 4,588,854(Bailey et al), U.S. Pat. No. 3,366,729 (Pauza), U.S. Pat. No. 4,043,629 (Brannen), U.S. Pat. No. 4,407,559 (Meyer), U.S. Pat. No. 4,451,106 (Wiseheart et al), U.S. Pat. No. 4,717,358 (Chaundy), and U.S. Pat. No. 2,891,103 (Swengel).

A number of these references relate to telephone or cable connections, as but two examples of low voltage type applications which do not require a complete metal enclosure or junction box at the connection. Typically, these low voltage type connections require appropriate drilling or cutting of plasterboard to allow the outlet to be secured in a wall and traditionally a square type aperture has been used.

According to the present invention, a circular aperture is used such that a drill can be used for effecting placement of the aperture in the drywall. In drilling of drywall and other substrates, often a raised edge occurs at the rear surface where the drill passes through the substrate. In the case of drywall, the back of the drywall often curls rather than being cut. When this occures, it slightly increases the thickness of the drywall adjacent the aperture and also renders securement somewhat more difficult in that the precise thickness of the wallboard is not known.

Other advantages of this type of system are described in my Pat. No. 4,840,584 the entire contents of which is incorporated herein by reference.

The present wall mounting assembly will be described with respect to securement on a wall having a wallboard substrate, however, it does have applications for other mounting applications where the substrate is of a generally known thickness and can be suitably ported. Such substrates include, but are not limited to metal sheeting, plywood or other wood substrates, concrete, tile, plaster, and drywall sheeting.

SUMMARY OF THE INVENTION

A mounting plate assembly for electrical connections, according to the present invention, comprises a face plate having associated therewith a tubular-like extension open through the face plate and extending in a generally perpendicular manner from a back surface of the face plate a predetermined depth, preferably at least about three-eighths of an inch. A plug portion is sized to be partially received within the tubular-like extension and is movable from a nonsecuring position to a wall engaging position. Control means is provided for controlling the plug portion between the nonsecuring position and the wall engaging position. The plug portion includes wall engaging means which are forcible through the tubular-like extension to a clear position where the wall engaging means move outwardly past the sides of the tubular-like extension to allow engagement with a rear surface of wall. The plug portion includes means for effecting an electrical connection and the control means controls the position of the plug, even when the wall engaging means move past the sides of the tubular-like extension. The depth of the tubular extension will vary with the particular substrate to which the mounting plate assembly is to be secured.

According to an aspect of the invention, the control means is a bias member which urges the plug portion towards the nonsecuring position. Thus, the plug portion is forced into the face plate against the bias means to a position where the wall engaging members move outwardly of the tubular-like extension whereafter movement of the plug under the influence of the bias means back towards the nonsecuring position causes the wall engaging means to engage the rear surface of the wall at which time the bias tends to draw the face plate into tight engagement with the front face of the wall.

According to a preferred aspect of the wall mounting plate assembly, the bias means is trapped between the plug portion and a stop surface on the tubular-like extension whereby movement of the plug into the tubular-like extension creates the bias force urging the plug out of the face plate.

According to yet a further aspect of the invention, the bias means includes a spring member which is integral with the plug portion.

According to yet a further aspect of the invention, the tubular-like extension includes ports intermediate the length thereof through which the wall engaging means extend when in said securing position.

BRIEF DESCRIPTION OF THE DRAWINGS

Preferred embodiments of the invention are shown in the drawings, wherein:

FIGS. 3 through 5 are horizontal sectional views through the mounting assembly about to be brought into securement with a wall;

DETAILED DESCRIPTION OF THE PREFERRED EMBODIMENTS

Figure 1:
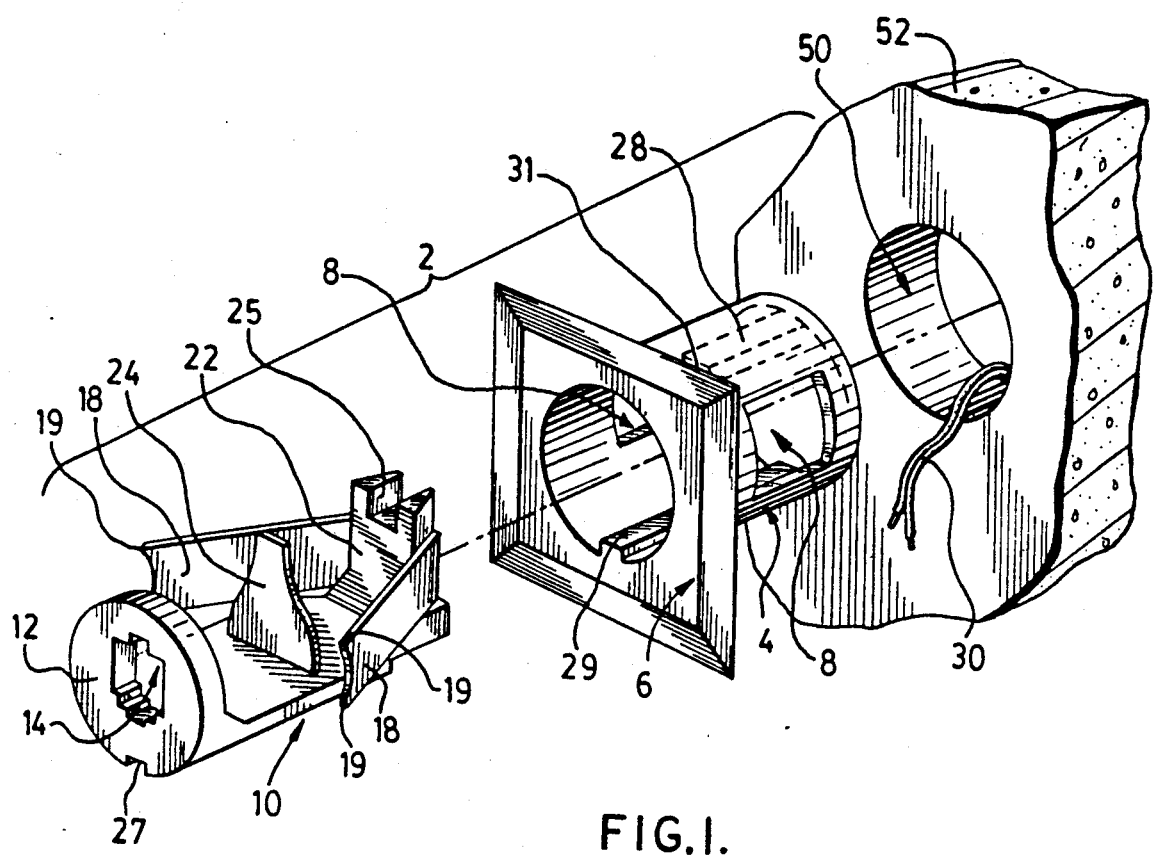
FIG. 1 is an exploded perspective view showing the mounting plate assembly about to be brought into securement with a wall member.
Figure 2:
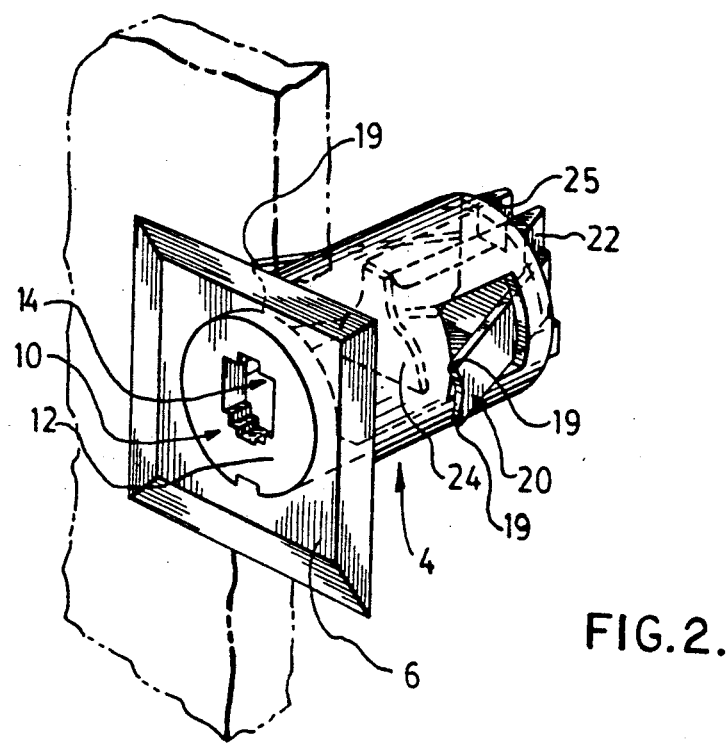
FIG. 2 is a partial perspective view showing the mounting assembly in securement with a wall with a portion of the wall removed.

The mounting plate assembly 2 comprises a face plate 6 in combination with a plug portion 10 which is slidably receivable within the tubular extension 4 of the face plate 6. The plug portion 10 is movable within the tubular extension 4 from a nonsecuring position, generally shown in FIGS. 1 and 3, to a securing position, generally shown in FIGS. 2 and 5. In order to have the plug moved to the securing position, it must first move past the securing position, as generally shown in FIG. 4, whereupon under the influence of a bias, it is urged to the securing position of FIG. 5.

The tubular extension 4 extends generally perpendicular to the back surface of the face plate 6 and includes therein stationary guides 28 and 29 which are receivable within guide slots 25 and 27 of the plug portion 10. Associated with the leading edge of the plug portion 10 are wall engaging members 18 which are disposed at an angle extending rearwardly and outwardly of the front portion of the plug portion 10. These wall engaging members cooperate with ports 8 provided in the sidewalls of the tubular extension 4 such that the wall engaging members initially pass through the tubular extension, past the thickness of the wall and once so disposed, move partially past the ports 8 at which time the arms tend to snap outwardly through the ports, whereafter the arms are free to engage the rear surface of the wall as the plug is urged under a bias towards its initial position. The ports 8 also serve to limit any longitudinal deflection of the arms 18. The bias is created by a leaf spring 24 extending from the plug which undergoes deflection in the manner generally shown in FIG. 8 as the leaf spring 24 comes into contact with the forward face 31 of the stationary guide 28.

The plug face 12 of the plug portion 10 in this case has been provided with a suitable port 14 for receiving the traditional receptacle connector of a telephone type connection. The wires for this connection can pass rearwardly through grooves or slots provided in the plug portion to allow electrical connection to a electrical supply indicated as 30. For example, all wires could pass through grooves provided in the bottom of the plug and pass through the plug directly behind port 14 for connection with a suitable receptacle which itself is received within a port provided in the plug face 12. The embodiment shown specifically is shaped for a telephone type connection, however, other types of connections are also possible. This assembly can include a suitable receptacle with the wires suitably retained in the plug and having terminals for connecting with wires 30 as a finished unit.

The tubular extension 4 is of a size to be in close proximity to the aperture of the circular hole 50 drilled through the wall 52 and it can be appreciated from FIGS. 3 through 5 that the tubular extension will pass clear of the rear face of the wall 52, with ports 8 of the tubular extension also clear of the rear surface of the wall 52. By forcing the plug portion 10 into the tubular extension in the manner indicated in FIG. 3, the wall engaging members 18 are biased inwardly towards the plug and due to the resilience of the material thereof, will spread through the ports 8 once the members have been inserted sufficiently to allow the members to clear the sides of the tubular extension. This relationship can generally be seen in FIG. 4 where the leaf spring 24 has been brought into engagement with the stop face 31 and is undergoing substantial deflection in creating a bias which urges the plug portion towards the position of FIG. 3. It can be seen that the plug face 12 has cleared the front face of the face plate 6 in FIG. 4, however, as the plug is allowed to return under the influence of the bias created by the leaf spring 24, the wall engaging members 18 will contact the rear surface of the wall 52 and create a bias urging the face plate 6 into contact with the front surface of the wall 52 with wall engaging members 18 engaging the rear surface. Thus, there is a residual bias in the leaf spring when the plug portion 10 is generally in the position shown in FIG. 5. This bias serves to maintain a very snug engagement of the plug portion 10 in the tubular extension and maintains the wall assembly in its proper position with the wall 52. The rear surface of the face plate has been provided with a number of wall inserting projections 60 which are forced into the front face of the wall 52. This serves to stop any rotation of the face plate 6 which would be possible due to the generally circular port 50 and the tubular extension 4 received therein. In addition, the outer ends 19 of the wall engaging members 18 are curved to provide bite portions either side of each arm for bearing against the back surface of the wall.

Figure 6:
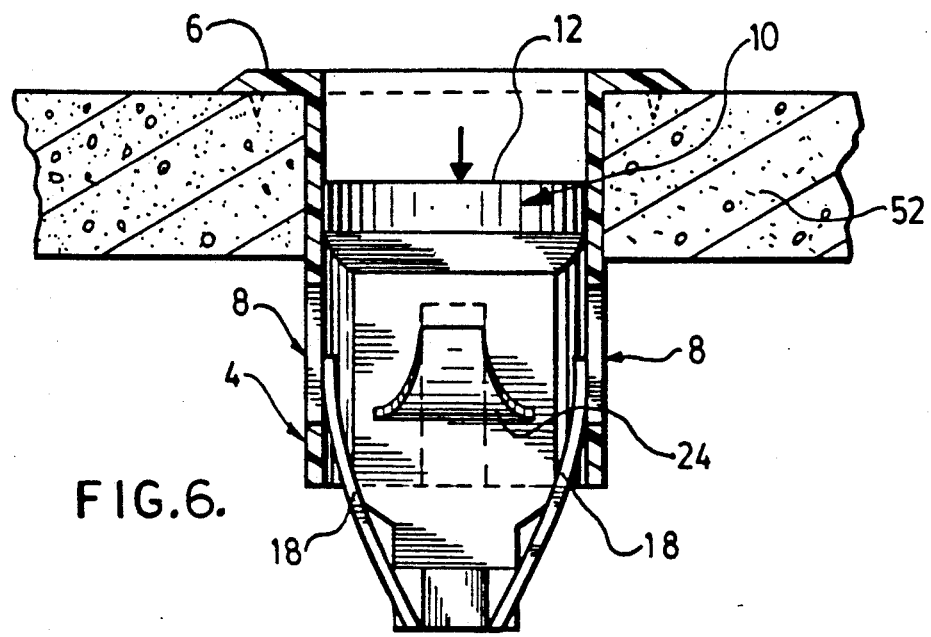
FIGS. 6 and 7 show the operation of the wall mounting plate to effect removal of the assembly from a wall.
Figure 7:
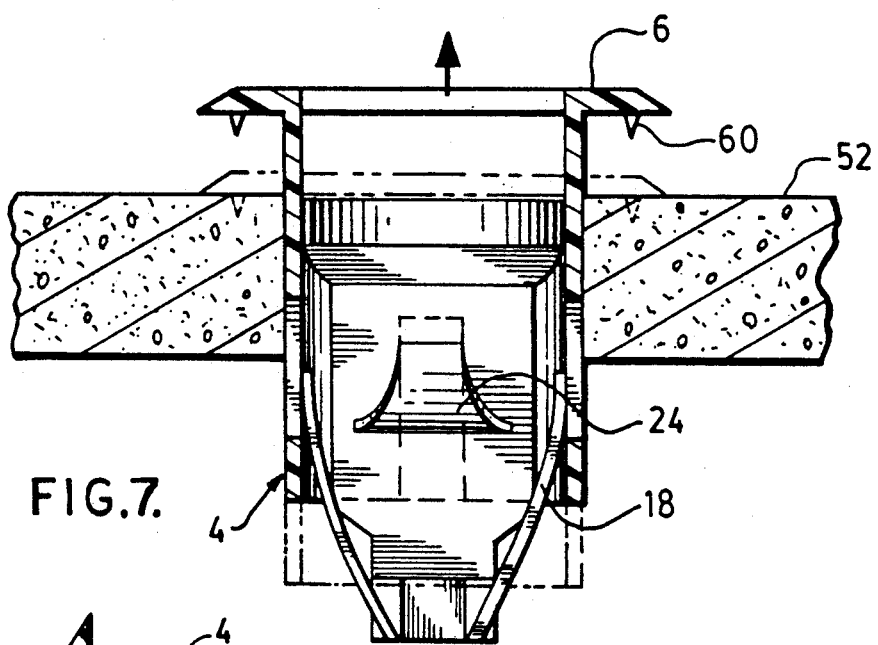
Figure 8:
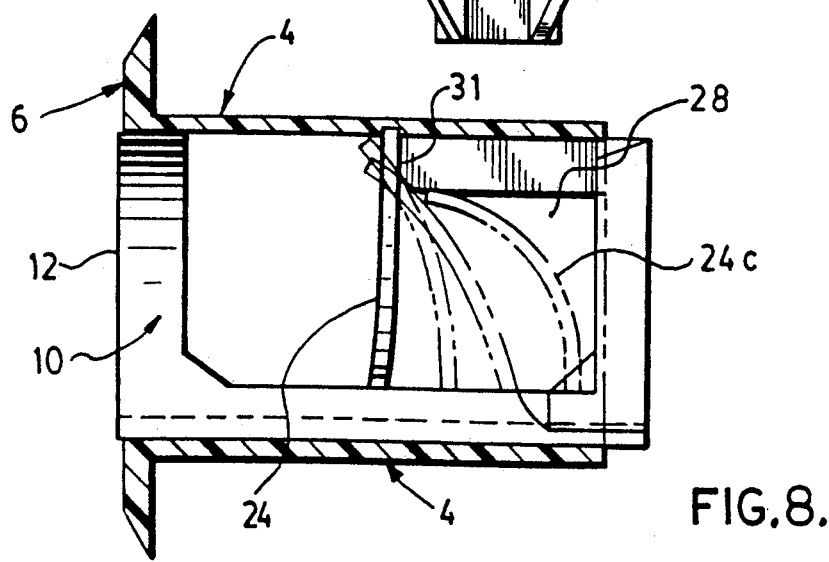
FIG. 8 is a vertical sectional view through the mounting assembly showing the operation of the leaf spring member.

Removal of the wall mounting plate assembly 2 from the wall 52 is shown in FIGS. 6 and 7. In FIG. 6, the plug portion 10 has been further inserted within the tubular extension and the wall engaging arms 18 have been drawn within the confines of the tubular extension due to the arms contacting the portion of the extension beyond the ports 8. The leaf spring member 24 will have undergone further deflection, as generally indicated in FIG. 8, where the leaf spring indicated as 24c has cleared the stop face 31. Once the wall engaging members 8 have been returned within the confines of the tubular extension 4, both the plug portion and the face plate 6 may be withdrawn from the wall as a unit, as generally indicated in FIG. 7. The entire assembly is removed from the wall, whereafter the user can remove the plug from the tubular extension in preparation for reinstalling of the entire assembly. In some cases, additional spring force may be desired and this can be obtained by adding an additional leaf spring immediately in front of the existing leaf spring and adapting the stop shoulder to appropriately contact each leaf spring. Other arrangements for adding additional spring force would include changing materials, thickening the leaf spring, and using a metal coil spring, as but some examples.

Figure 9:
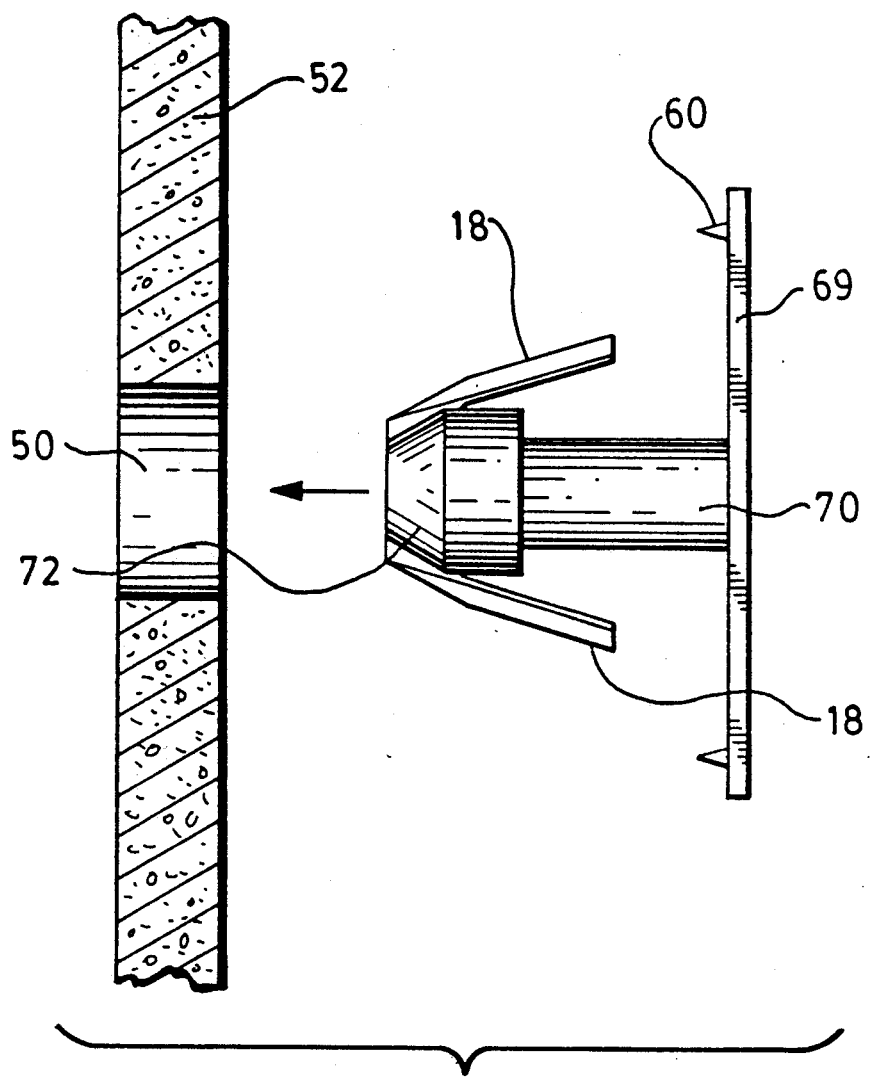
FIG. 9 is a side elevation of an alternate embodiment.

In FIG. 9, a slightly different embodiment is shown, wherein the face plate and plug have been made integral and no provision is provided for having the plug portion pass through a tubular extension as it is passing through the port in the wall. In this embodiment, the face plate 6a is provided with wall inserting projections 60, similar to the embodiment previously described, however, the plug portion is now defined by support member 70 which positions a insert portion 72 at a spaced distance from the face plate 6a. The insert portion 72 has wall engaging arms 18 which are forced inwardly as they pass through the circular port 50 provided in the wall member 52. The arms 18 will spring past the rear surface of the wall once they clear the port and cause a spring type engagement with the back surface of the wall. These arms, as they spring outwardly, will serve to maintain the face plate in proper engagement with the front surface of the wall 52. As can be appreciated, the face plate can be deflected somewhat inwardly to urge the wall engaging members 18 to pass the rear surface of the wall and spring outwardly, and this inward deflection of the face plate 6a will provide a spring bias to ensure positive engagement of the face plate 6a with the front surface of the wall 52.

In contrast to the embodiment of FIGS. 1 through 8, the embodiment of FIG. 9 is indeed much simpler, however, it does not have all the advantages of the two piece wall assembly previously described. With respect to the embodiment of FIG. 9, the electrical wires would again pass through or gain access to the face plate 6a to effect electrical connection either directly with a receptacle provided in the face plate 6a or the face plate 6a may be ported to receive a suitable electrical connection. The receptacle is preferably a low voltage, fast connection port such as telephone port, or cable port, as but two examples.

The structure as generally shown in the drawings and described herein can be made entirely of a plastic material and each part, i.e. the face plate 6 and the plug portion 10, can be made by injection moulding. This arrangement only requires a generally circular hole to be appropriately located in a wall, whereafter the face plate with its tubular extension can be inserted in the wall and subsequently the plug portion 10 can be inserted to create a bias locking the plug portion 10 and the face plate in an appropriate position on a wall. Other arrangements for creating the bias or spring bias for maintaining the engagement of the face plate and plug portion with a wall are possible. For example, the plug portion 10 could compress a captured coil spring member, however, such an arrangement increases the complexity by adding an additional part. Possibly other arrangements for incorporating the spring member directly in the plug portion are possible, however, the leaf spring is a particularly simple embodiment which has proven satisfactory. It is apparent in choosing the material of the plug portion that the particular design requirements must include a review of the characteristics of the leaf spring which preferably is of the same material as the plug.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A mounting plate assembly for electrical connections comprising:

a face plate having associated therewith a tubular-like extension open through said face plate and extending in a generally perpendicular manner from a back surface of said face plate a predetermined depth, a plug portion sized to be partially received within said tubular-like extension and move from a nonsecuring position to a substrate engaging position, and control means for controlling movement of said plug portion between said nonsecuring position and said wall engaging position, said plug portion including substrate engaging means which are forcible through said tubular-like extension to a clear position where said substrate engaging means move outwardly past the sides of said tubular-like extension to engage a rear surface of a substrate, said plug portion including means for receiving an electrical connector, said control means being operative to urge said plug portion towards said nonsecuring position even when said substrate engaging means have moved past the sides of said tubular-like extension to draw said substrate engaging means and said face plate into engagement with a substrate when located therein.

2. A mounting plate assembly as claimed in claim 1, wherein said control means is a bias means which cooperates to provide a bias urging said plug portion towards said nonsecuring position, which bias is created as said plug portion is moved within said tubular extension towards said substrate engaging position and provided a bias drawing said substrate engaging means and said face plate towards one another when said substrate engaging means have passed said clear position.

3. A mounting plate assembly as claimed in claim 2, wherein said bias means is trapped between said plug portion and a stop surface on said tubular-like extension.

4. A mounting plate assembly as claimed in claim 2, wherein said bias means includes a spring member integral with said plug portion.

5. A mounting plate assembly as claimed in claim 2, wherein said tubular-like extension includes ports intermediate the length thereof through which said substrate engaging means extend when in said securing position.

6. A mounting plate assembly as claimed in claim 5, wherein said tubular extension beyond said ports include camming surfaces for engaging said substrate engaging means and causing the same to return within the confines of the tubular extension by forcing said plug portion further into said tubular extension.

7. A mounting plate assembly as claimed in claim 2, wherein said tubular extension is of an appropriate size to extend slightly beyond the rear surface of a sheet of drywall when the drywall is appropriately ported and receives said substrate mounting plate.

8. A mounting plate assembly as claimed in claim 1, 2 or 3, wherein said substrate engaging means include at least two arms extending outwardly and rearwardly from said plug.

9. A mounting plate assembly as claimed in claim 4, 5 or 6, wherein said substrate engaging means include at least two arms extending outwardly and rearwardly from said plug.

10. A mounting plate assembly as claimed in claim 2, 3 or 4, wherein said bias means is a leaf spring member disposed to project at an angle from the longitudinal axis of said plug portion and which undergoes deflection to create said bias as said plug is inserted in said tubular extension of said face plate.

11. A mounting plate assembly as claimed in claim 1, 2 or 3, wherein said tubular extension is sized to extend substantially beyond the interior surface of a sheet of drywall with a number of ports initially opening through the sides of said tubular extension slightly beyond the interior surface of the sheet of drywall when received therein.

12. A mounting plate assembly as claimed in claim 1, 2 or 3, wherein said tubular extension is of a depth of at least about ⅜ of an inch.

* * * * *